United States Patent Office 3,210,336
Patented Oct. 5, 1965

3,210,336
PRODUCTION OF 1-SUBSTITUTED
HOMOPIPERAZINES
Fedor Poppelsdorf, Charleston, W. Va., assignor to Union Carbide Corporation, a corporation of New York
No Drawing. Filed June 20, 1963, Ser. No. 289,414
10 Claims. (Cl. 260—239)

This invention is directed to a novel process for the synthesis of heterocyclic nitrogen containing compounds. More particularly, the invention relates to a novel process for the preparation of monosubstituted 1-homopiperazines. In a particular aspect, the invention is directed to a novel process for the production of 1-methylhomopiperazine.

Due to the outstanding and desirable physiological characteristics of the derivatives of 1-methylhomopiperazine, this compound is currently of interest as a pharmaceutical intermediate. For example, the works of A. H. Sommers, R. J. Michaels, Jr., and A. W. Weston, J. Am. Chem. Soc., 76, 5805 (1954), J. W. Reinertson and P. E. Thompson, Antibiotics and Chemotherapy, 5, 556 (1955), and P. Brookes, R. J. Terry and J. Walker, J. Chem. Soc., 3165 (1957), G. H. Berryman and G. Lanoff, Annals of Allergy 19, 884 (1961), and E. T. Kimura, U.S. Patent 3,035,976, indicate the desirable physiological properties of derivatives of 1-methylhomopiperazine. These desirable features have stimulated investigation for a commercially feasible synthetic route to prepare this compound.

Heretofore, 1-methylhomopiperazine (III) has been prepared by several known methods. For example, one method involves a ring enlargement of expensive 1-methyl-4-piperidone (I) by a Schmidt-type rearrangement followed by a lithium aluminum hydride reduction of the resulting homopiperazinone (II).

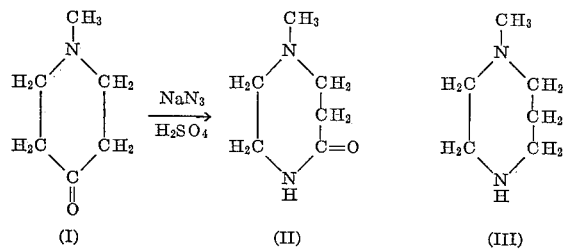

A different procedure employs a catalytic cyclodehydration of N-(2'-hydroxyethyl)-N-methyl-1,3-propanediamine to form 1-methylhomopiperazine in a yield of about 13 percent. A third method involves the catalytic reductive cyclization of N-(2-cyanoethyl)-methylethylenediamine.

Each of the aforesaid processes suffers from the disadvantage of poor yields. A further handicap which hampers production is the relative inaccessibility of the starting materials, notwithstanding the disadvantage of their high cost. For example the 1-methyl-4-piperidone is an expensive intermediate requiring at least three steps to prepare, making it very costly and virtually unsuitable for large scale production.

It is therefore an object of the instant invention to provide a novel process for the production of 1-substituted homopiperazines. It is another object of this invention to provide a novel process which is readily adaptable to large scale quantity production techniques. It is a further object of this invention to provide a novel synthesis of 1-methylhomopiperazines. Further objects will be apparent in the light of the ensuing specification and claims.

The novel process comprises contacting an 8-substituted 1,5-diazabicyclo[3.2.1]octane of the formula:

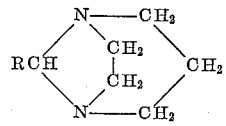

wherein R is a monovalent organic radical hereinafter described, with an excess of formic acid, isolating the 1-substituted-4-formylhomopiperagine formed by the addition of formic acid, and finally hydrolyzing the said formyl derivative with an aqueous solution of a base or a mineral and to the corresponding 1-substituted homopiperazine. The novel process may be illustrated by the equation:

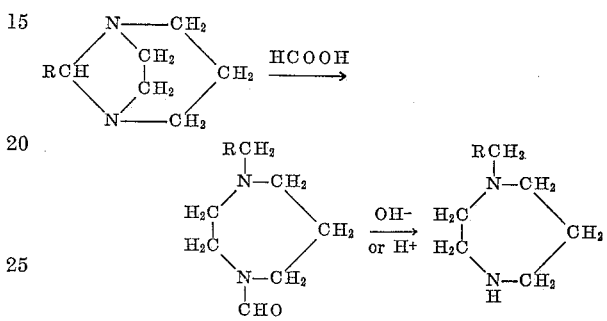

wherein R represents a monovalent organic radical hereinafter described.

It should be noted that the homopiperazine produced by the novel process of this invention is substituted in the 1-position by a monovalent substituent having the formula R—$CH_2$— wherein R corresponds to the R substituent in the bicyclic reactant. Accordingly, illustrative 1-substituted homopiperazines which can be produced by the novel process from various 8-substituted diazabicyclo[3.2.1]octanes are set forth below. The left hand column below lists the substituents in the 8-position on the diazabicyclo[3.2.1]octane reactant, while the right hand column lists the corresponding monosubstituted homopiperazines, which may be produced from the said octanes by the novel process.

| R substituent bicyclooctane | Monosubstituted homopiperazine |
|---|---|
| hydrogen | 1-methylhomopiperazine. |
| Methyl | 1-ethylhomopiperazine. |
| Ethyl | 1-propylhomopiperazine. |
| n-Propyl | 1-butylhomopiperazine. |
| Isopropyl | 1-(2'-methylpropyl)homopiperazine. |
| Butyl | 1-pentylhomopiperazine. |
| 1-ethylpentyl | 1-(2'-ethylhexyl)homopiperazine. |
| 2-ethylhexyl | 1-(3'-ethylheptyl)homopiperazine. |
| Heptyl | 1-octylhomopiperazine. |
| Nonyl | 1-decylhomopiperazine. |
| Octadecyl | 1-nonadecylhomopiperazine. |
| Vinyl | 1-(2'propenyl)homopiperazine. |
| Cyclohexyl | 1-cyclohexylmethylhomopiperazine. |
| Phenyl | 1-benzylhomopiperazine. |
| Tolyl | 1-xylylhomopiperazine. |
| Para-chlorophenyl | 1-(4'-chlorobenzyl)homopiperazine. |
| Naphthyl | 1-(1-naphthylmethyl)homopiperazine. |
| 2'-furyl | 1-(2'-furylmethyl)homopiperazine. |
| 2'-tetrahydrofuryl | 1-(2'-tetrahydrofurylmethyl)homopiperazine. |
| 3'-pyridyl | 1-(3'-pyridylmethyl)homopiperazine. |
| 2'-thienyl | 1-(2'-thienylmethyl)homopiperazine. |

In a preferred embodiment of the novel process, a mixture of the reactants is formed by gradually adding excess formic acid to the 8-substituted-1,5-diazabicyclo[3.2.1]octane with stirring. The order of addition can be reversed, i.e., the 8-substituted-1,5-diazabicyclo[3.2.1]octane can be added gradually to excess formic acid. The reaction mixture is refluxed for about 30 minutes to 60 hours, with the cessation of evolution of carbon dioxide determining the completion of the reaction. The formyl derivative of the octane, i.e., the corresponding 1-substituted-4-formylhomopiperazine may be separated from the reaction product mixture by distillation.

The temperature at which the formic acid is added to the 8-substituted-1,5-diazabicyclo[3.2.1.]octane is not critical and can range from about 10 to about 130° C. A temperature in the range of from about 70 to 100° C. is preferred. Since the reaction of the formic acid with the octane is exothermic it may be desirable to control the reaction temperature by cooling or by measured addition of the formic acid.

The 8-substituted-1,5-diazabicyclo[3.2.1.]octane may be employed in a solution of an inert solvent, e.g., toluene. As hereinafter discussed, the preparation of the octane proceeds with the formation of an equimolar amount of water. It is preferred to remove the water from the 8-substituted-1,5-diazabicyclo[3.2.1.]octane prior to the reaction with formic acid, although such non-aqueous conditions are not necessary. This may be accomplished by use of a drying agent or by distillation of the octane product. In addition to toluene, other inert organic solvents such as methylcyclohexane, cyclohexane, xylene, ethylbenzene, cumene, benzene, and the like may be employed.

The product mixture resulting from the reaction with formic acid contains the corresponding 1-substituted-4-formyl homopiperazine, excess formic acid and the inert solvent employed. The remainder consists primarily of 1,4-diformylhomopiperazine and 1,4-disubstituted homopiperazine wherein the substituent corresponds to that of the desired mono-substituted homopiperazine. The 1-substituted-4-formylhomopiperazine may be separated from the reaction product mixture by standard distillation techniques. If desired, the 1,4-diformylhomopiperazine and the 1,4-disubstituted homopiperazine which are by-products of the formic acid reaction may be recovered thereafter.

The final step of the novel process involves hydrolysis of the 1-substituted-4-formyl homopiperazine to obtain the mono-substituted compound. This hydrolysis is accomplished by contacting the formyl derivative with a solution of aqueous alkali or by the hydrolysis with aqueous mineral acid. The addition of the alkali or acid is preferably accompanied by vigorous agitation to ensure intimate contact of the two phases. The hydrolysis can be effected by refluxing the mixture. Generally from about 2 to about 20 hours is required for the hydrolysis, the end of which is signalled by a decrease of temperature to a minimum. Bases which are suitable for use for this hydrolysis include sodium hydroxide, potassium hydroxide, calcium hydroxide, and barium hydroxide. The mineral acids which are suitable for hydrolysis include hydrochloric acid, phosphoric acid, sulfuric acid and the like.

The desired 1-substituted homopiperazine may be separated from the reaction product mixture by any suitable means such as distillation, solvent extraction, or the like to obtain substantially pure 1-substituted homopiperazine.

The hydrolysis is effected with an excess over the stoichiometric proportion of aqueous alkali or acid solution. The molar proportions of base employed are not critical however, an excess is used to ensure hydrolysis of all the 1-substituted-4-formylhomopiperazine. Generally 1 to 6 times the stoichiometrically required amount of base is employed. Hydrolysis temperature is not critical and may vary from about 100° C. to about 180° C. but will depend upon the particular reactants employed. As stated above, reflux conditions may be used and are in fact preferably employed to ensure contact between the phases and completeness of the reaction. The reaction may generally be ascertained as complete when the reaction product mixture attains a constant minimum temperature.

The novel process of the instant invention may be utilized to produce a 1-substituted homopiperazine from diazabicyclo[3.2.1]octanes having a variety of substituents in the 8-position. The 8-substituted diazabicyclo[3.2.1] octanes which are eminently suitable for use in the instant novel process are those hereinbefore structurally described wherein R represents a monovalent organic radical which is not reactive with formic acid. Suitable diazabicyclo [3.2.1]octanes are those wherein R is hydrogen, or substituted and unsubstituted aliphatic alicyclic, aromatic, and heterocyclic groups particularly wherein the heterocyclic atom is oxygen, sulfur or nitrogen. By the term "substituted," as used throughout the specification and appended claims, is meant that the aforementioned R group can be aliphatic with alicyclic or aromatic substituents, aromatic with aliphatic or alicyclic substituents, as well as other substituents not reactive with formic acid hereinafter disclosed.

Preferred as reactants are those diazabicyclo[3.2.1]octanes wherein the R substituent is a hydrocarbyl radical, for example, alkyl, alkenyl, cycloalkyl, cycloalkenyl, aryl, and also aralkyl, alkaryl and the like. Highly preferred are alkyl, in particular, methyl. However, it is to be considered within the scope of this invention to utilize diazabicyclo[3.2.1]octane reactants wherein the said substituent in the 8-position contains elements other than carbon and hydrogen. The substituents may also contain oxygen, sulfur and nitrogen, within a heterocyclic ring system and also may contain halogen, e.g., chlorine, particularly when bonded directly to an aromatic nucleus.

Eminently suitable diazabicyclo[3.2.1]octanes which may be utilized in the novel process of this invention are those wherein the R substituent contains up to 18 carbon atoms, preferably up to 12 carbon atoms, and highly preferably up to 8 carbon atoms.

The following compounds illustrate the reactants contemplated in the present novel process: 1,5-diazabicyclo [3.2.1]octane, 8-methyl-1,5-diazabicyclo[3.2.1]octane, 8-ethyl-1,5-diazabicyclo[3.2.1]octane, 8-propyl-1,5-diazabicyclo[3.2.1]octane, 8-nonyl-1,5-diazabicyclo[3.2.1]octane, 8-nonyl-1,5-diazabicyclo[3.2.1]octane, 8-heptadecyl-1,5-diazabicyclo[3.2.1]octane, 8-phenyl-1,5-diazabicyclo [3.2.1]octane, 8-naphthyl-5-diazabicyclo[3.2.1]octane, 8-cyclohexyl-1,5-diazabicyclo[3.2.1]octane, 8-vinyl-1,5-diazabicyclo[3.2.1]octane, 8-(2'-ethylhexyl)-1,5-diazabicyclo[3.2.1]octane, 8-(2'-propenyl)-1,5-diazabicyclo [3.2.1]octane, 8-(3'-butenyl)-1,5-diazabicyclo[3.2.1]octane, 8-(2'-furyl)-diazabicyclo[3.2.1]octane, and the like, 8-(2-thienyl)-1,5-diazabicyclo[3.2.1]octane.

In a preferred embodiment, the reactants contemplated for use in the novel process can be conveniently represented by the formula:

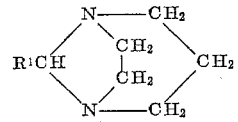

wherein $R^1$ represents hydrogen or an alkyl group having from 1 to 18 carbon atoms, more preferably from 1 to 12 carbon atoms, and still more preferably from 1 to 8 carbon atoms.

Illustrative compounds within this embodiment include, among others 1,5-diazabicyclo[3.2.1]octane, 8-methyl-1,5-diazabicyclo[3.2.1]octane 8-ethyl-1,5-diazabicyclo[3.2.1] octane, 8-propyl-1,5-diazabicyclo[3.2.1]octane, 8-isopropyl-1,5-diazabicyclo[3.2.1]octane, 8-butyl-1,5-diazabicyclo [3.2.1]octane, 8-pentyl-1,5-diazabicyclo[3.2.1]octane, 8-(2-ethylhexyl)-1,5-diazabicyclo[3.2.1]octane, 8-heptyl-1, 5-diazabicyclo[3.2.1]octane, 8-nonyl-1,5-diazabicyclo [3.2.1]octane, 8-undecyl-1,5-diazabicyclo[3.2.1]octane, 8-dodecyl-1,5-diazabicyclo[3.2.1]octane, 8-tetradecyl-1,5-diazabicyclo[3.2.1]octane, 8-hexadecyl-1,5-diazabicyclo[3.2. 1]octane, 8-octadecyl-1,5-diazabicyclo[3.2.1]octane, and the like.

In a second embodiment reactants contemplated for use in the novel process of the instant invention can be represented by the following formula:

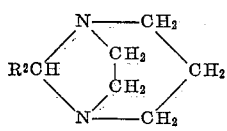

wherein $R^2$ represents an aryl group containing from 6 to 18 carbon atoms and more preferably from 6 to 12 carbon atoms. Illustrative novel compositions within this embodiment include among others, 8-phenyl-1,5-diazabicyclo[3.2.1]octane, 8-tolyl-1,5-diazabicyclo[3.2.1]octane, 8-naphthyl-1,5-diazabicyclo[3.2.1]octane, 8-anthryl-1,5-diazabicyclo[3.2.1]octane, 8 - phenanthryl-1,5-diazabicyclo [3.2.1]octane, 8-(4'-biphenylyl) - 1,5-diazabicyclo[3.2.1] octane, 8-(2'-indenyl) - 1,5-diazabicyclo[3.2.1]octane, 8-(1'-pyrenyl)-1,5-diazabicyclo[3.2.1]octane and the like.

In a third embodiment, novel 8-substituted 1,5-diazabicyclo[3.2.1]octanes can be represented by the formula:

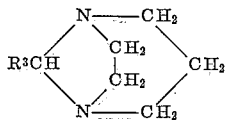

wherein $R^3$ represents a heterocyclic group containing from 4 to 18 carbon atoms, more preferably from 4 to 12 carbon atoms and still more preferably from 4 to 8 carbon atoms. Typical 1,5 - diazabicyclo[3.2.1]octanes substituted at the 8-position include, among others, 8-(2'-furyl)-1,5-diazabicyclo[3.2.1]octane, 8-(2'-tetrahydrofuryl)-1,5-diazabicyclo[3.2.1]octane, 8-(phenanthridinyl)-1,5-diazabicyclo[3.2.1]octane, 8-(3'-pyridyl)-1,5-diazabicyclo[3.2.1]octane, 8-(2'-thienyl) - 1,5 - diazabicyclo[3.2.1] octane, and the like.

The 8-substituted - 1,5 - diazabicyclo[3.2.1]octanes employed as reactants in the novel process are themselves novel compounds, and provide the subject of a copending application entitled "Derivatives of Homopiperazine," Serial No. 91,585, filed February 27, 1961, by Fedor Poppelsdorf, now U.S. Patent 3,159,647.

These 8 - substituted-1,5-diazabicyclo[3.2.1]octane reactants can be conveniently produced by the reaction of an aldehyde with an equivalent molar quantity of homopiperazine as illustrated by the following equation:

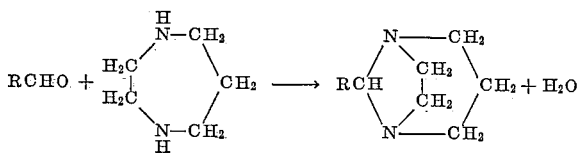

wherein R has the same value as previously indicated or as indicated by $R^1$, $R^2$ and $R^3$ above. The reaction may be accomplished by gradually adding stoichiometric amounts of the aldehyde to homopiperazine with stirring at a temperature of from about −20° C. to about 200° C. Since the reaction is exothermic it may be desirable to control the reaction temperature by cooling or by measured rate of addition of aldehyde. The reaction time may vary from one half to twenty four hours. Inasmuch as one mole of water is produced on this reaction for each mole of product, the use of a drying agent, such as anhydrous magnesium sulphate might be desirable, though not necessary. Likewise a chemically inert solvent may be employed as the reaction medium.

The following examples are illustrative:

EXAMPLE I

*Preparation of solution containing 1,5-diazabicyclo[3.2.1]octane*

An aqueous 35.9 percent solution of formaldehyde (334.8 grams, 4.0 moles) was added wtih stirring over a 10 minute period to a solution of homopiperazine (400.8 grams, 4.0 moles) in toluene (824 grams). The reaction was markedly exothermic causing a temperature rise of from 25 to 71° C. After all the formaldehyde had been introduced the mixture was stirred for 15 minutes, and water was removed azeotropically by distillation through a packed column fitted with an automatic decanting device which removed the water layer from the distillate and returned the toluene layer to the column. There remained 1370 cc. of a dry toluene solution containing 1,5-diazabicyclo[3.2.1]octane.

EXAMPLE II

*Preparation of 1-methylhomopiperazine*

A 90.5 percent solution of formic acid (610 grams, 685 cc., 12.0 moles) was continuously added over a period of one hour, with stirring, to one-half of the toluene solution of 1,5-diazabicyclo[3.2.1]octane obtained in Example I. Reaction began spontaneously, with evolution of carbon dioxide and heat. The temperature was allowed to rise to 70° C. and held there by regulation of the formic acid feed rate. After the addition was complete, the mixture was refluxed until carbon dioxide evolution ceased, marking the end of the reaction. The overall reaction time was about 5 hours, with a maximum kettle temperature of 125° C. The reaction mixture was distilled through a column having an efficiency of about 7 theoretical plates to the top of which was fitted an automatic decanting device for removing the lower layer (aqueous formic acid) and returning the upper layer (toluene) to the column. The distillation was continued until the distillate became homogeneous, indicating that removal of water and formic acid was complete. The aqueous formic acid collected amounted to 446 grams. Distillation of the organic layer through the same column gave 1-methyl-4-formylhomopiperazine as a fraction boiling at 126–128° C. at a pressure of 5 millimeters of mercury. The quantity of 1-methyl-4-formylhomopiperazine abtaintd represented a 56.9 percent yield based on the starting homopiperazine of Example I. This 1-methyl - 4 - formylhomopiperazine (130.0 grams) then was added to a hot solution of sodium hydroxide pellets (36.6 grams) in 50 percent aqueous sodium hydroxide solution (300 grams). The mixture was refluxed for 9 hours with rapid stirring. During the reaction the temperature fell progressively from 156 to 134° C. at which point it remained constant during the last two hours of refluxing.

As the mixture was allowed to cool, solid sodium formate precipitated in the aqueous phase. The mixture was allowed to cool to room temperature, and the organic layer was separated and distilled at atmospheric pressure through a column having an efficiency of about 5 theoretical plates. There was obtained 82.9 grams of a fraction boiling at 161–164° C. at 749 millimeters of mercury which fraction had a refractive index of 1.4770 and was identified as 1-methyl-homopiperazine. The product represented a yield of 88.6 percent based on the 1-methyl-4-formylhomopiperazine and an overall yield of approximately 50 percent based on the starting homopiperazine of Example I.

EXAMPLE III

*8-propyl-1,5-diazabicyclo[3.2.1]octane*

To 300.6 grams (3 moles) of molten homopiperazine, 216.3 grams (3 moles) of n-butyraldehyde were gradually added with stirring over a twenty minute period. A markedly exothermic reaction took place. The mixture was stirred for fifteen minutes after the addition of the aldehyde had been completed and then distilled under reduced pressure at a reflux ratio of 3 to 1 through a fractionating column having an efficiency of about ten theoretical plates. 381.9 grams of 8-propyl-1,5-diazabicyclo[3.2.1]octane (82.5 percent yield) was obtained as a fraction boiling at 103° C. at a pressure of 20 millimeters of mercury. The compound had a refractive index, $n_D^{20}$, of 1.4786, and the following analysis. Calculated for $C_9H_{18}N_2$: C, 70.07; H, 11.76; N, 18.17; molecular weight, 154.25. Found: C, 69.76; H, 11.69; N, 18.4; molecular weight, 156.

EXAMPLE IV

Preparation of 1-n-butylhomopiperazine

To 468 grams of a 90 percent formic acid solution (9.0 moles) heated to 75° C., was continuously added, with stirring, 231.4 grams of 8-propyl-1,5-diazabicyclo[3.2.1]octane over a period of one hour. During the addition, the reaction temperature was kept between 75 and 83° C. after all the 8-propyl-1,5-diazabicyclo[3.2.1]octane had been added, the reaction mixture was gradually heated to the reflux temperature (116° C.) and then refluxed until carbon dioxide evolution had practically ceased. About 70 minutes' refluxing was required for this point to be reached. Water and excess of formic acid were stripped off at atmospheric pressure, and the residue was distilled at reduced pressure through a fractionating column having an efficiency of about five theoretical plates. There were obtained three main fractions (A), (B), and (C).

Fraction (A) weighed 92.8 grams, had a boiling point of 107–116° C. at 5.0 millimeters of mercury and consisted of the monoformate of 1,4-dibutylhomopiperazine.

Fraction (B) weighed 101.5 grams, had a boiling point of 143–144° C. at 5.0 millimeters of mercury, and was 1-butyl-4-formylhomopiperazine.

Fraction (C) weighed 74.2 grams, had a boiling point of 203–207° C. at 3.0 millimeters of mercury and was slightly impure 1,4-diformylhomopiperazine.

A mixture of 80.0 grams of 1-butyl-4-formylhomopiperazine prepared in the above manner, and 280.0 grams of 20 percent hydrochloric acid was refluxed for three hours. The final solution, which was homogenous, was cooled to ambient temperature and then was basified by the cautious addition, with stirring, of sodium hydroxide, aqueous 50 percent (100 grams). The upper layer (82.0 grams) which separated was removed and distilled under reduced pressure through a column having an efficiency of about four theoretical plates. 1-butylhomopiperazine (51.9 grams) was obtained as a fraction having a boiling point of 106.5–107° C. at 20.0 millimeters of mercury. It had a refractive index, $n_D^{20}$ 1.4717 and the following analysis. Calculated for $C_9H_{20}N_2$: Tertiary-amino N, 8.96; neutralization equivalent, 78.15. Found: tertiary-amino N [by the method of Critchfield, Funk, and Johnson, Anal. Chem., 28, 76 (1956)], 8.96; neutralization equivalent, 78.5.

EXAMPLE V

8-(1'-ethylpentyl)-1,5-diazabicyclo[3.2.1]octane

To a solution of 300.6 grams (3 moles) of homopiperazine in 619 grams of benzene, 384.6 grams (3 moles) of 2-ethylhexaldehyde were gradually added with stirring. The reaction was markedly exothermic. After the addition of the aldehyde had been completed, the mixture was stirred for an additional period and then dehydrated azeothopically. Distillation of the dried benzene solution through a fractionating column gave 8-(1'-ethylpentyl)-1,5-diazabicyclo[3.2.1]octane as a fraction boiling at 96° C. at a pressure of 1.0 millimeter of mercury. The product had a refractive index, $n_D^{20}$, of 1.4775 and the following analysis. Calculated for $C_{13}H_{26}N_2$: C, 74.22; H, 13.42; N, 13.32; molecular weight 210.35. Found: C, 74.3; H, 13.1; N, 13.21; molecular weight, 211.

EXAMPLE VI

Preparation of 1-(2'-ethylhexyl)homopiperazine

To 312.0 grams of 90 percent formic acid there was added dropwise, with stirring, 91.5 grams of 8-(1'-ethylpentyl)-1,5-diazabicyclo[3.2.1]octane. During the addition the temperature of the mixture rose from 25 to 40° C. The temperature of the mixture was then increased to 70° C.; the source of external heat was removed, and a further quantity of 118.9 grams of 8-(1'-ethylpentyl)-1,5-diazabicyclo[3.2.1]octane was added over a period of 20 minutes. During the addition of the second portion of the bicyclic compound the reaction temperature remained between 72 and 77° C.

The mixture was refluxed for nine and one-half hours after all the bicyclic compound had been added. Evolution of carbon dioxide had almost ceased at the end of this period of reflux.

Water and excess formic acid were stripped off at atmospheric pressure, and the residue was distilled at reduced pressure through a fractionating column having an efficiency of about five theoretical plates. 170.3 grams of a fraction having a boiling point of 178–180° C. at 5.0 millimeters of mercury was obtained. This was washed once with an equal volume of aqueous 50 percent sodium hydroxide and then redistilled under reduced pressure. A main fraction of 134.7 grams was obtained which had a boiling point of 178° C. at 5.0 millimeters of mercury and consisted of a mixture of 1-(2'ethylhexyl)-4-formylhomopiperazine and 1,4-di(2'-ethylhexyl)homopiperazine.

100.0 grams of the foregoing mixture was dissolved in 350 grams of aqueous 20 percent hydrochloric acid, and the solution was refluxed for three hours. The resulting clear brown solution was evaporated to a syrup under reduced pressure; the residue was dissolved in an equal volume of water, and the solution was evaporated again to a syrup. This operation was twice repeated.

The final residue was basified by the addition, with stirring, of 160 grams of aqueous 50 percent sodium hydroxide. Two layers separated. The lower, aqueous layer was strongly alkaline to phenolphthalein. Distillation of 83.7 grams of the upper organic layer under reduced pressure through a column having an efficiency of about five theoretical plates afforded two main fractions (A) and (B).

Fraction (A) weighed 43.8 grams had a boiling point of 124–125° C. at 5.0 millimeters of mercury, and was 1-(2'-ethylhexyl)homopiperazine; it possessed the following analysis. Calculated for $C_{13}H_{28}N_2$: Tertiary-amino N, 6.60; neutralization equivalent, 106.2. Found: Tertiary-amino N, 6.57; neutralization equivalent, 106.6.

Fraction (B) weighed 16.6 grams, had a boiling point of 186.5–188° C. at 5.0 millimeters of mercury, and was 1,4-di(2'-ethylhexyl)homopiperazine; it had the following analysis. Calculated for $C_{21}H_{44}N_2$: Tertiary-amino N, 8.63; Tertiary-amino N, 8.63; neutralization equivalent, 162.3. Found: Tertiary-amino N, 8.40; neutralization equivalent, 161.0.

EXAMPLE VII

8-phenyl-1,5-diazabicyclo[3.2.1]octane

To a solution of 300.6 grams (3 moles) of homopiperazine in 619 grams of benzene, 318.4 grams of benzaldehyde (3 moles) were gradually added with stirring over a ten minute period. The reaction was sufficiently exothermic to cause the mixture to boil. The mixture was stirred for 30 minutes after the addition of the benzaldehyde had been completed, and then the water liberated during the reaction was removed azeotropically. Concentration and cooling of the dried benzene solution caused the separation of 533.8 grams of colorless crystals of 8-phenyl-1,5-diazabicyclo[3.2.1]octane which represented a 94.5 percent yield. After being crystallized from triethylamine and hexane the product had a melting point of 82–84° C. Analyses showed the product to have the following composition. Calculated for $C_{12}H_{16}N_2$: C, 76.5; H, 8.6; N, 15.0; molecular weight, 188; neutralization equivalent, 94.1. Found: C, 76.4; H, 8.8; N, 14.7; molecular weight, 188; neutralization equivalent, 94.3.

EXAMPLE VIII

Preparation of 1-benzylhomopiperazine

To 188.3 grams of 8-phenyl-1,5-diazabicyclo[3.2.1]octane (1 mole) was added 312 grams of 89 percent formic acid (6 moles), with stirring. During the addition the temperature of the mixture rose to 85° C. and carbon dioxide evolution began. After the formic acid addition had been completed, the mixture was refluxed until evolution of carbon dioxide had ceased, a reflux period of about 53 hours being required for this point to be reached. Water and excess formic acid were stripped off, and the residue was distilled under reduced pressure through a column having an efficiency of about five theoretical plates. The main fraction secured weighed 183.0 grams, had a boiling point of 166° C. at 1.0 millimeter of mercury and contained 1-benzyl-4-formylhomopiperazine.

A mixture of 120.0 grams of the foregoing fraction and 202.3 grams of aqueous 55.4 percent sodium hydroxide was refluxed for 16 hours with rapid stirring. During the reaction the reflux temperature fell progressively from 146° C. to a minimum of 129° C. After cooling of the mixture to room temperature the upper, organic layer was separated and distilled under reduced pressure through a column having an efficiency of about 10 theoretical plates. 1-benzylhomopiperazine was obtained as a fraction of boiling point 138° C. at 5.0 millimeters of mercury; it had the following analysis. Calculated for $C_{12}H_{18}N_2$: Tertiary-amino N, 7.36; neutralization equivalent, 95.1. Found: Tertiary-amino N, 7.22; neutralization equivalent, 95.6.

What is claimed is:

1. A process for the production of 1-substituted homopiperazines which comprises contacting formic acid and an 8-substituted-1,5-diazabicyclo[3.2.1]octane of the formula:

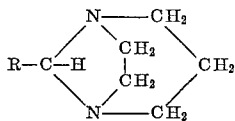

wherein R is a monovalent radical selected from the group consisting of hydrogen, alkyl, alkenyl, cycloalkyl, cycloalkenyl, hydrocarbon aryl, furyl, tetrahydrofuryl, pyridyl, and thienyl containing up to 18 carbon atoms, to obtain a reaction product mixture containing the corresponding 1-substituted-4-formylhomopiperazine of the formula:

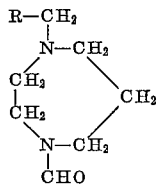

wherein R has the same designation as above, and hydrolyzing said formylhomopiperazine to obtain the corresponding 1-substituted homopiperazine.

2. A process for the production of a 1-substituted homopiperazine which comprises contacting excess formic acid and an 8-alkyl-1,5-diazabicyclo[3.2.1]octane wherein said alkyl group contains from 1 to 18 carbon atoms to obtain the correpsonding 1-(alkyl)methyl-4-formylhomopiperazine, and hydrolyzing said formylhomopiperazine to the corresponding 1-(alkyl)methylhomopiperazine.

3. A process for the production of a 1-substituted homopiperazine which comprises contacting excess formic acid and an 8 - alkenyl-1,5 - diazabicyclo[3.2.1]octane wherein said alkenyl group contains up to 18 carbon atoms to obtain the corresponding 1-(alkenyl)methyl-4-formylhomopiperazine, and hydrolyzing said formylhomopiperazine to the corresponding 1-(alkenyl)methylhomopiperazine.

4. A process for the production of a 1-substituted homopiperazine which comprises contacting excess formic acid and an 8-cycloalkyl-1,5-diazabicyclo[3.2.1]octane wherein said cycloalkyl group contains up to 18 carbon atoms to obtain the corresponding 1-(cycloalkyl)methyl-4-formylhomopiperazine and hydrolyzing said formylhomopiperazine to the corresponding 1-cycloalkylmethylhomopiperazine.

5. A process for the production of a 1-substituted homopiperazine which comprises contacting excess formic acid and an 8-hydrocarbon aryl-1,5-diazabicyclo[3.2.1]octane wherein said hydrocarbon aryl group contains from 6 to 18 carbon atoms to obtain the corresponding 1-hydrocarbon arylmethyl-4-formylhomopiperazine and hydrolyzing said formylhomopiperazine to the corresponding 1-hydrocarbon arylmethylhomopiperazine.

6. A process for the production of 1-(2'-propenyl) homopiperazine which comprises contacting excess formic acid and 8-vinyl-1,5-diazabicyclo[3.2.1]octane at a temperature of from about 10 to about 130° C., to obtain 1-(2'-propenyl)-4-formylhomopiperazine and hydrolyzing said 1-(2'-propenyl)-4-formylhomopiperazine to 1-(2'-propenyl)homopiperazine.

7. A process for the production of 1-methylhomopiperazine which comprises contacting excess formic acid and 1,5-diazabicyclo[3.2.1]octane at a temperature of from about 10 to about 130° C., to obtain 1-methyl-4-formylhomopiperazine and hydrolyzing said 1-methyl-4-formylhomopiperazine to 1-methylhomopiperazine.

8. A process for the production of 1-butylhomopiperazine which comprises contacting excess formic acid with 8-n-propyl-1,5-diazabicylo[3.2.1]octane at a temperature of from about 10 to about 130° C., to obtain 1-butyl-4-formylhomopiperazine, and hydrolyzing said 1-butyl-4-formylhomopiperazine to 1-butylhomopiperazine.

9. A process for the production of 1-(2'-ethylhexyl) homopiperazine which comprises contacting excess formic acid and 8-(1'-ethylpentyl)1,5-diazabicyclo[3.2.1]octane at a temperature of from about 10 to about 130° C., to obtain 1-(2'-ethylhexyl)-4-formylhomopiperazine, and hydrolyzing said 1-(2'-ethylhexyl)-4-formylhomopiperazine to 1-(2'-ethylhexyl)homopiperazine.

10. A process for the production of 1-benzylhomopiperazine which comprises contacting excess formic acid and 8-phenyl-1,5-diazabicyclo[3.2.1]octane at a temperature of from about 10 to about 130° C., to obtain 1-benzyl-4-formylhomopiperazine, and hydrolyzing said 1-benzyl - 4-formylhomopiperazine to 1-benzylhomopiperazine.

No references cited.

NICHOLAS S. RIZZO, *Primary Examiner.*